US009406182B2

(12) United States Patent
Gartner

(10) Patent No.: US 9,406,182 B2
(45) Date of Patent: Aug. 2, 2016

(54) METHOD OF AUTOMATICALLY ACTIVATING A USER CODE FOR AN ELECTRONIC LOCK

(71) Applicant: Klaus W. Gartner, Palos Verdes Estates, CA (US)

(72) Inventor: Klaus W. Gartner, Palos Verdes Estates, CA (US)

(73) Assignee: MG TECH CENTER BV H.O.D.N. LOCK TECHNOLOGY, Ulft (NL)

(*) Notice: Subject to any disclaimer, the term of this patent is extended or adjusted under 35 U.S.C. 154(b) by 129 days.

(21) Appl. No.: 14/206,730

(22) Filed: Mar. 12, 2014

(65) Prior Publication Data

US 2015/0262440 A1 Sep. 17, 2015

(51) Int. Cl.
*G05B 19/00* (2006.01)
*G07C 9/00* (2006.01)

(52) U.S. Cl.
CPC .......... *G07C 9/00912* (2013.01); *G07C 9/0069* (2013.01)

(58) Field of Classification Search
CPC ......... G07C 7/00; G07C 9/00126; G08B 3/10
USPC ........................................ 340/5.54, 5.61, 540
See application file for complete search history.

(56) References Cited

U.S. PATENT DOCUMENTS 5,713,149 A * 2/1998 Cady ........................ F41A 17/04 42/70.06
6,097,306 A * 8/2000 Leon ........................ G07C 1/32 340/10.1
2007/0192464 A1* 8/2007 Tullberg ........... H04L 29/12009 709/223
2011/0088087 A1* 4/2011 Kalbratt .................. G06F 21/33 726/7

* cited by examiner

*Primary Examiner* — Vernal Brown
(74) *Attorney, Agent, or Firm* — Barbara A. Wrigley; Fox Rothschild LLP

(57) ABSTRACT

A method of automatically activating a user code for an electronic lock having a keypad entry system is provided. The method includes providing an electronic lock having a keypad, the lock including a factory-set service code and a factory-activated default user code. During installation, the factory-set service code is entered into the keypad and the lock confirms that the entered factory-set service code is valid. The default service code is changed by entering a new service code. When the lock confirms that the new service code is a valid service code, the factory activated user code is automatically activated.

3 Claims, 1 Drawing Sheet

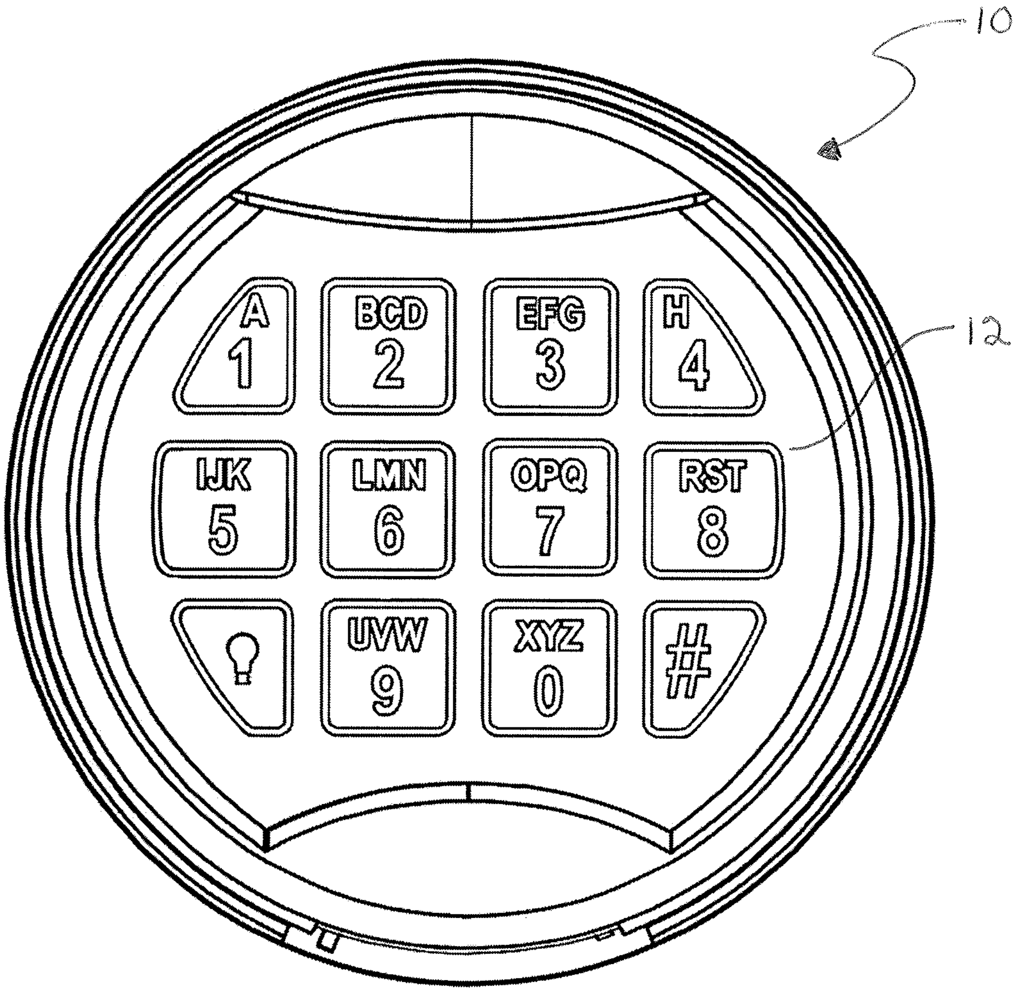
10
12
A
1
BCD
2
EFG
3
H
4
IJK
5
LMN
6
OPQ
7
RST
8
UVW
9
XYZ
0

METHOD OF AUTOMATICALLY ACTIVATING A USER CODE FOR AN ELECTRONIC LOCK

FIELD OF THE INVENTION

The present invention relates generally to keypad assemblies and methods of setting up a service code to permit servicing of an electronic lock, primarily for safes and other secure containers. In particular the present invention is directed to a method of automatically activating a user code.

BACKGROUND OF THE INVENTION

Safes and other secure containers have traditionally used combination locks for controlling and authorizing entry. Locks were mechanical and relied on a person dialing a correct combination on a rotating dial to access the lock and/or safe for service and repair. The rotation positioned mechanical elements within the lock such that dialing the correct combination allowed a locking bolt to release the container door. For example, traditional mechanical locks, such as Gartner, U.S. Pat. No. 3,968,667 (1976), rely on a dial rotating tumblers. Proper dial rotation aligns gates in the tumblers. Once the gates are aligned, a fence on a fence lever can enter the aligned gates. Continued rotation of the dial and tumblers pulls the fence lever and withdraws the bolt.

Electronics have replaced mechanical structures in many locks. Electronic locks can use electronics rather than aligned tumbler wheels to sense entry of the correct combination. The electronics can sense the rotary position of a combination lock dial, or a keypad can replace the combination dial. Consequently, instead of dialing a number, e.g., “72,” the user would first push the “7” and then the “2” keys for the same result. Uyeda, U.S. Pat. No. 5,134,870 (1992) and Gartner, U.S. Pat. No. 5,136,870 (1992) are examples of a keypad entry system for a safe and door lock, respectively.

When the lock is used to secure entry to a container, the electronic components are typically mounted in a housing inside the container door. The housing contains a battery and a circuit board, which contains the electronic circuitry controlling the lock. The keypad is on the outside of the housing so as to be accessible to the user. A cable typically extends between the keypad and the circuit board for transmitting signals between the two components.

Generally, the keypad is on the outside of the keypad housing and parallel to the safe or container wall. Traditional electronic keypads generally include ten keys that correspond with the numbers “0” through “9.”

Presently electronic locks are shipped from the factory with one code set: a “master” or “service” code, typically 5.5.5.5.5.5. When the lock is received by the original equipment manufacturer or installer, the installer mounts the lock on the door. The installer then changes the factory set service code to a “service” code number, which is recorded by the installer with the serial number of the safe and known only to the installer. The installer then enters a user code, typically 1.2.3.4.5.6., using a known time-consuming routine so that the user can access the safe. The user may change the code later on to a number the user will readily remember.

However, the present method of setting a user code is time-consuming and not ideal. For example, having the installer add the user code takes an unnecessary amount of time. In addition, the installer may accidentally record the user code as the service code, corresponding with the safe serial number. When the user subsequently changes the code to their own code the service code will no longer match the safe serial number and is lost forever.

Thus, there is a need for an improved access system for electronic locks that will address the foregoing problems. In particular a new system of accessing electronic lock is needed that eliminates having to add the user (second) code by the installer.

BRIEF SUMMARY OF THE INVENTION

The problems associated with conventional means of servicing a lock is addressed by the present invention.

In one aspect of the invention a default service code is present in an electronic lock in the factory that will open the lock. A default or “factory activated” user code is also set but the default user code is not activated at the time the electronic lock is shipped to the installer.

In another aspect of the invention, an installer upon installation of the lock enters the factory set default service code. The installer may then change the factory set default service code to a new service code. Entering the new service code automatically activates the default or “factory activated” user code, which will open the lock. Because the user code has been automatically activated, the user may then or thereafter use the factory activated user code to open the door and/or to change the user code to a new user code.

In another aspect of the invention, a method of automatically activating a user code on an electronic lock having a keypad is provided. The method includes providing an electronic lock having a key pad, said electronic lock including a factory-set service code and a factory-activated user code; installing the electronic lock on a container to be locked; entering the factory-set service code on the keypad; confirming that the entered factory-set service code is valid; setting a new service code by entering the new service code into the keypad; confirming that the new service code is a valid service code; prior to closing the container re-entering the new service code; again confirming that the new service code is a valid service code; and upon confirmation that the new service code is a valid service code, automatically activating the factory activated user code.

In other aspects of the invention, the method includes changing the factory activated user code to a new user code by entering the factory activated user code into the keypad of the electronic lock; entering the new user code twice; confirming that the new user code is valid; prior to closing the container re-entering the new user code; confirming that the new user code is valid.

BRIEF DESCRIPTION OF THE DRAWINGS

For a better understanding of the invention, and to show how the same may be carried into effect, reference will now be made, by way of example, to the accompanying drawings, in which:

FIG. 1 is an exemplary electronic lock illustrating a keypad in accordance with the invention.

DETAILED DESCRIPTION OF THE INVENTION

The present invention is a method of setting a service code and a user code at a factory so that the user code is automatically trigger when the service code is accessed.

FIG. 1 is an exemplary electronic lock 10 illustrating a keypad 12 in accordance with the invention. An electronic lock is set at the factory with a service code, typically 5-5-5-5-5-5, but any combination of numbers may be used. The service code is designed to open the lock by an installer upon installation. The factory also sets a "factory-activated" or default user code but it is not activated at the time of shipping.

Using the changing function on a lock an installer changes the factory set service code to a different/new service code that is recorded with the safe serial number. On the keypad the number 0 is held down until the LED shows an ON signal to the installer. A double beep provides an audio signal to the installer. Those of skill in the art will appreciate however that three or more "beeps" can provide an audio signal to the installer. The installer enters the factory set service code and a double beep again confirms that the code is correct. The installer enters a new, random six digit code twice. Prior to closing the door of the safe, the new service code is re-entered into the key pad and audibly confirmed that the code is valid and has been correctly entered. A double beep will confirm that the code is correct while a long single beep indicates an invalid or incorrect code.

After the factory set service code is changed to a new service code, the factory activated user code is automatically activated and the installer does not need to set a user code thus saving the installer time and expense. Rather, the user can then or thereafter open the door of the safe and/or secure container and change the factory set user code to a random number the user can remember easily.

To change the factory activated user code, the number 0 on the keypad is held down by the user until the LED shows an ON signal and a double beep provides an audio signal to the user that the electronic lock is activated. Those of skill in the art will appreciate however that three or more "beeps" can provide an audio signal to the user. Generally, however, two beeps is a valid entry while three beeps or one long beep is an invalid entry. The user enters the factory activated user code and a double beep audio signal confirms that the entered factory activated user code is correct. The user then enters a new, random six digit user code twice. Prior to closing the door of the safe, the new user code is confirmed by re-entering the code into the key pad. A double beep will confirm that the code is correct.

Although the present invention has been described with reference to certain aspects and embodiments, those of ordinary skill in the art will appreciate that changes may be made in form and detail without departing from the spirit and scope of the invention.

What is claimed is:

1. A method of automatically activating a default, factory-set user code by an electronic lock having a keypad comprising:

providing an electronic lock having a key pad, said electronic lock having memory including a default, factory-set service code and a default factory set user code, said electronic lock programmed to activate said default factory-set user code when the default, factory-set service code is changed;

entering a service code into the electronic lock via the keypad;

comparing the entered service code to the default, factory-set service code stored in memory by the electronic lock;

if the entered service code is the same as the default, factory-set service code then providing a confirmation signal by the electronic lock that the entered service code is a valid service code;

changing the default, factory-set service code by entering a new service code into the electronic lock via the keypad;

re-entering the new service code into the electronic lock via the keypad;

issuing a confirmation signal by the electronic lock that the re-entered new service code is a valid service code; and upon providing confirmation that the re-entered new service code is a valid service code, automatically activating the default factory set user code by the electronic lock.

2. The method of claim 1 further comprising:

setting a new user code by entering the default factory activated user code into the electronic lock via the keypad;

if the entered default factory-activated user code is the same as the default factory-activated user code stored in memory then providing a confirmation signal by the electronic lock that the entered user code is a valid user code;

entering the new user code twice into the electronic lock via the keypad;

providing confirmation by the electronic lock that the new user code is a valid new user code.

3. A method of automatically activating a default, factory-set user code by an electronic lock having a keypad comprising:

providing an electronic lock having a key pad, said electronic lock having memory including a default, factory-set service code and a default factory-set user code, said electronic lock programmed to activate said default factory-set user code when the default, factory-set service code is changed.

* * * * *